United States Patent Office 3,558,355
Patented Jan. 26, 1971

3,558,355
PROCESS FOR ENHANCEMENT OF SWEETNESS OF SUGARS
Kanzo Okazaki, Shigeharu Kohno, Isao Yamatsu, Kunishige Sugiyama, and Seigo Ueyama, Tokyo, Japan, assignors to Eisai Kabushiki Kaisha, Tokyo, Japan
No Drawing. Filed July 12, 1968, Ser. No. 744,345
Int. Cl. C13k 1/00, 3/00, 9/00
U.S. Cl. 127—46
1 Claim

ABSTRACT OF THE DISCLOSURE

Process for partial interconversion of glucose into fructose which is sweeter than the glucose by contacting an aqueous solution of glucose with a mixture of or a concomitant existence of a strongly basic anion exchange resin and a moderately basic anion exchange resin, both resins being in their hydroxyl form, at a moderate temperature and for a time sufficient to establish an equilibrium state between the glucose and fructose. By virtue of the concomitant use of the aforementioned resins, an increased conversion velocity of glucose into fructose is obtained without injurious side reaction products which would bring about contamination, coloration and objectionable flavor of the final product.

---

This invention relates to an improved process for the enhancement of sweetness of sugars, especially glucose which is produced commercially by acid hydrolysis or hydrolytic enzymosis of starch, of corn, potato and the like.

There have been many methods proposed and contemplated for interconversion or isomerization of glucose into the sweeter fructose. One of these known methods is that provided by Lobry de Bruyn and van Ekenstein. According to this method, the interconversion of glucose into fructose is carried out in an aqueous alkaline medium.

The method has, however, not been commercially successful, because the method is accompanied with undesirable side reactions resulting in the production of a considerable amount of non-sugar substances involving various organic acids, colored bodies, bitter substances and so on. The purification of such contaminated sugar solution requires additional troublesome and costly steps of operation.

Another method for the interconversion of glucose into fructose is disclosed in U.S. Pat. No. 2,746,889, which utilizes a strongly basic anion exchange resin as isomerizing catalyst. In comparison with the aforementioned known method in which an aqueous alkaline medium is employed, the process of the U.S. patent is highly appreciated, inasmuch as it enables the production of an interconverted sugar solution at a high yield without formation of undesirable side products such as aforementioned. Additional benefits of this method reside in the fact that it can be conveniently conducted in a simple apparatus or equipment which may be constructed with conventional and inexpensive materials, with elimination of auxiliary apparatus such as decoloration and deionization equipment and the like.

A primary difficulty encountered in conducting this method on a commercial scale is its considerably low interconversion velocity. Another defect is that it necessitates an apparatus capable of operating under severe exclusion of air or gaseous oxygen in order to prevent the sugar solution from acquiring a probable undesired coloration, which otherwise will occur during such a long working cycle.

In either event, it is known that the interconversion reaction of glucose into fructose will cease when an equilibrium state is established between the unchanged glucose and the resulting fructose. In a broad range of temperatures, the treated sugar solution at the established equilibrium state contains the glucose and fructose in the ratio of about 67:33 to about 65:35 by weight.

It has been found according to the present invention that the interconversion velocity of glucose into fructose is considerably facilitated, and accordingly, the establishment of an equilibrium state between glucose and fructose at a moderately elevated temperature can be performed within a considerably short time, when an aqueous solution of glucose at a concentration of from 10% to 30% by weight or higher is subjected to intimate contact with a mixture of, or a concomitant existence of, a shaped strongly basic anion exchange resin and a shaped moderately basic anion exchange resin in a proportion of from 3:1 to 2:1 by volume.

It has further been found that the process of the present invention can be carried out without the necessity for exclusion of air or oxygen and that there is obtained a colorless or almost colorless conversion product.

The temperature to be employed in carrying out the process of the present invention is not critical. Thus, the process may be conducted within a broad range of temperatures such as, for example, from room temperature to an elevated temperature such as 100° C. with the proviso that the resins are capable of tolerating such temperature.

In an embodiment of the novel process of this invention, a 10–30% by weight aqueous solution of crude or refined glucose is prepared. A mixture of strongly basic anion exchange resin (hydroxyl state) of polystyrene polyammonium type and a moderately basic anion exchange resin (hydroxyl state) of polystyrene polytertiary amine type in a ratio of 2:1 by volume, for example, is prepared separately. The resin mixture is then introduced into the above-mentioned glucose solution at a moderately elevated temperature, i.e., 40° C. or slightly higher. The mixture is held at that temperature with mild stirring for about 3 hours until analysis shows an establishment of the equilibrium state. At the end of this time, the spent resins are removed by filtration and the filtrate is contacted with a cation exchange resin in order to remove any minute amount of organic amine compound which might be formed as a result of partial decomposition of the basic resins. The aqueous solution, after removal by filtration of the cation exchange resin, is concentrated in accordance with a conventional procedure, preferably under reduced pressure to obtain a desired concentration.

Determination of the interconversion efficiency or yield of fructose in the treated sugar solution may be carried out by any one of the known methods, such as the Bertrand-Gabriel method.

Exemplary of the strongly basic anion exchange resin of the polystyrene polyammonium type which is used in its hydroxyl state in accordance with the present invention are those which are commercially available, such as, for example, Amberlites IRA–400, IRA–401, IRA–402, IRA–411 and the like sold by Rohm and Haas Co. as well as Dow-X No. 1, Dow-X No. 2 and the like sold by Dow Chemical Co.

Exemplary of the moderately basic anion exchange resin which is used in the process of the present invention are those which are commercially available such as, for example, Amberlites IRA–68, IRA–93 and the like as well as Lewatits MP–60, MIH–59 and the like sold by Bayer Aktiengellschaft. Of course, all these basic anion exchange resins are converted to their active state prior to use (in a form of the hydroxyl state) by tetrating them with a dilute caustic alkali solution.

The beneficial technical effect achieved by the process of the present invention in which the strong basic and moderately basic resins are employed in admixture will be demonstrated by the following data:

| Ratio of strongly basic resin to moderately basic resin in admixture | Time in hrs. required for establishment of equilibrium state (40° C.) | Appearance (color) of sugar solution after treatment |
| --- | --- | --- |
| 2:1 | 1.5–3 | Equal to original. |
| 3:1 | 3–4 | Almost equal to original. |
| Strongly basic resin only (control) | 8–9 | Fairly brown. |

Examples illustrating, but in no sense limiting, the invention are given below.

EXAMPLE 1

500 grams of glucose dissolved in 2 liters of water at the temperature of about 40° C. was stirred with 300 cc. of Amberlite IRA–401 and 150 cc. of Lewatit MP–60 at the temperature of 40° C. for 2.5 hours, both resins having been previously converted into their hydroxyl state.

The resins were then filtered off and the filtrate was stirred at room temperature with 50 cc. of Amberlite IR–120, a strongly acidic cationic exchange resin, to remove, through absorption, any possible amino compounds as a partial decomposition product of the basic anion exchange resins, and filtered. The clear sugar solution was evaporated under reduced pressure with tap water-suction. A viscous syrup was obtained. Analysis of the product according to the Bertrand-Gabriel method gave the total amount of 468 grams of the sugars consisting of the unchanged glucose and fructose as the isomerization product in the ratio of 66:34 by weight.

EXAMPLE 2

500 grams of glucose were dissolved in 2 liters of warm water. The sugar solution thus obtained was stirred slowly with 300 cc. of Amberlite IRA–411 and 100 cc. of Amberlite IRA–93 at the temperature of about 40° C. for 3 hours, the resins having been previously converted into their hydroxyl state. The mixture was further treated in the same manner as in Example 1. There was thus obtained a syrup which on analysis contained 460 grams of a mixture of glucose and fructose in the ratio of 67:33 by weight.

EXAMPLE 3

A 25% aqueous solution containing a total of 500 grams of glucose was recycled repeatedly through a vertical column of 6 cm. inside diameter filled with a mixture of 300 cc. of Amberlite IRA–411 and 150 cc. of Lewatit MP–60, both resins being in their hydroxyl state. When a sample which was periodically taken from the effluent of the column showed the rotary polarization of $[\alpha]_D^{25}=15.50$ (1=0.5 dc.), the effluent was once passed through a vertical column filled with Amberlite IR–120, a strongly acidic cation exchange resin. About 2 hours were required for the completion of the total recyclings. The effluent was then concentrated under reduced pressure. The resulting syrup on analysis contained 466 grams of the mixed sugars in the proportion of 65% of glucose and 35% of fructose, by weight.

What is claimed is:

1. A process for the enhancement of sweetness of a glucose solution comprising contacting an aqueous solution of glucose with a mixture of a strongly basic anion exchange resin and a moderately basic anion exchange resin in a volume ratio of about 2:1 to 3:1, both resins being in their hydroxyl form, for a time sufficient to establish an equilibrium state between the unchanged glucose and the fructose formed by partial conversion of the glucose, and recovering the resultant mixture of glucose and fructose from the solution.

References Cited

UNITED STATES PATENTS 2,746,889  5/1956  Langlois et al. _____ 127—46X
3,285,776  11/1966  Scallet et al. _____ 127—46X

FOREIGN PATENTS 391,997  2/1964  Japan.

OTHER REFERENCES

Hattori et al., "Formation of Fructose During the Production of Glucose From Starch," Chem. Abs. 60:13425 (1964).

Dai-Nippon, "Fructose From Glucose," Chem. Abs. 59:14186 (1963).

Kainuma et al., "Isomerization of Dextrose Into Fructose," Chem. Abs. 64:9932 (1966).

JOSEPH SCOVRONEK, Primary Examiner

D. G. CONLIN, Assistant Examiner

U.S. Cl. X.R.

127—30, 36, 41